(12) United States Patent
Qiao

(10) Patent No.: US 11,001,139 B2
(45) Date of Patent: May 11, 2021

(54) INVERTED FOCALIZED TRANSMISSION MOUNT

(71) Applicant: FORD GLOBAL TECHNOLOGIES, LLC, Dearborn, MI (US)

(72) Inventor: Hong Qiao, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1124 days.

(21) Appl. No.: 14/967,906

(22) Filed: Dec. 14, 2015

(65) Prior Publication Data

US 2017/0166049 A1 Jun. 15, 2017

(51) Int. Cl.
| | |
|---|---|
| *F16M 11/00* | (2006.01) |
| *B60K 17/00* | (2006.01) |
| *B60K 17/06* | (2006.01) |
| *F16H 57/025* | (2012.01) |
| *F16H 57/028* | (2012.01) |

(52) U.S. Cl.
CPC .............. *B60K 17/00* (2013.01); *B60K 17/06* (2013.01); *F16H 57/025* (2013.01); *F16H 57/028* (2013.01)

(58) Field of Classification Search
CPC .................................. F16F 1/377; F16F 1/52
See application file for complete search history.

(56) References Cited

U.S. PATENT DOCUMENTS

| | | | |
|---|---|---|---|
| 5,291,966 A | 3/1994 | Kato | |
| 6,415,884 B1 | 7/2002 | Hawener et al. | |
| 6,959,922 B2 | 11/2005 | Miyahara | |
| 7,784,763 B2 * | 8/2010 | Bunker | F16F 1/377 248/637 |
| 2007/0199742 A1 | 8/2007 | Miyahara et al. | |

FOREIGN PATENT DOCUMENTS

CN    201925406 U    8/2011

* cited by examiner

*Primary Examiner* — Amy J. Sterling
(74) *Attorney, Agent, or Firm* — Vincent Mastrogiacomo; MacMillan, Sobanski & Todd, LLC

(57) ABSTRACT

A transmission mount has a mount base with first and second surfaces. The first surface has a transmission attachment point and the second surface has a vehicle attachment point. The second surface is opposite the first surface. The mount base also has first and second end portions angled towards a middle portion of the second surface. The middle portion is between the first and second end portions.

18 Claims, 3 Drawing Sheets

INVERTED FOCALIZED TRANSMISSION MOUNT

BACKGROUND OF INVENTION

The present invention relates to automotive transmissions and in particular to transmission mount assemblies for use in securing a transmission in an automotive vehicle.

An automotive transmission is part of a powertrain of an automotive vehicle and is supported in the vehicle on one or more transmission mount assemblies. Known focalized transmission mounts may have end portions angled inwards towards the transmission and away from an attachment point of the mount to the vehicle. The mount has an equivalent elastic center. As a consequence, the inward angled end portions define the equivalent elastic center above the mount.

The mount is secured to both the transmission and the vehicle and provides isolation to reduce noise, vibration, and harshness generated by the transmission. The noise, vibration, and harshness is reduced as a roll mode purity value for the powertrain increases.

SUMMARY OF INVENTION

An embodiment contemplates a transmission mount. A mount base has first and second surfaces. The first surface has a transmission attachment point and the second surface has a vehicle attachment point. The second surface is opposite the first surface. The mount base also has first and second end portions angled towards a middle portion of the second surface. The middle portion is between the first and second end portions.

Another embodiment contemplates a transmission mount. A mount base has first and second surfaces. The first surface has a transmission attachment point and the second surface has a vehicle attachment point. The second surface is opposite the first surface. The mount base also has first and second end portions angled towards a middle portion of the second surface. The middle portion is between the first and second end portions. A transmission is attached to the transmission attachment point.

Another embodiment contemplates a transmission mount. A mount base has first and second plates. The first plate has a transmission attachment point and the second plate has a vehicle attachment point. The second plate is opposite the first plate. Rubber pads support the first plate on the second plate. The mount base also has first and second end portions angled towards a middle portion of the second plate. The middle portion is between the first and second end portions. A transmission is bolted to the transmission attachment point. The angled end portions define an elastic center of the mount below the mount base.

An advantage of an embodiment is defining an equivalent elastic center, of a transmission mount, lower in a vehicle. The roll mode purity value increases as the elastic center of the mount is lowered. The angled end portions of the mount limit how far the elastic center may be lowered. The lower equivalent elastic center increases a roll mode purity value, which may reduce noise, vibration, and harshness.

DETAILED DESCRIPTION

Figure 1:
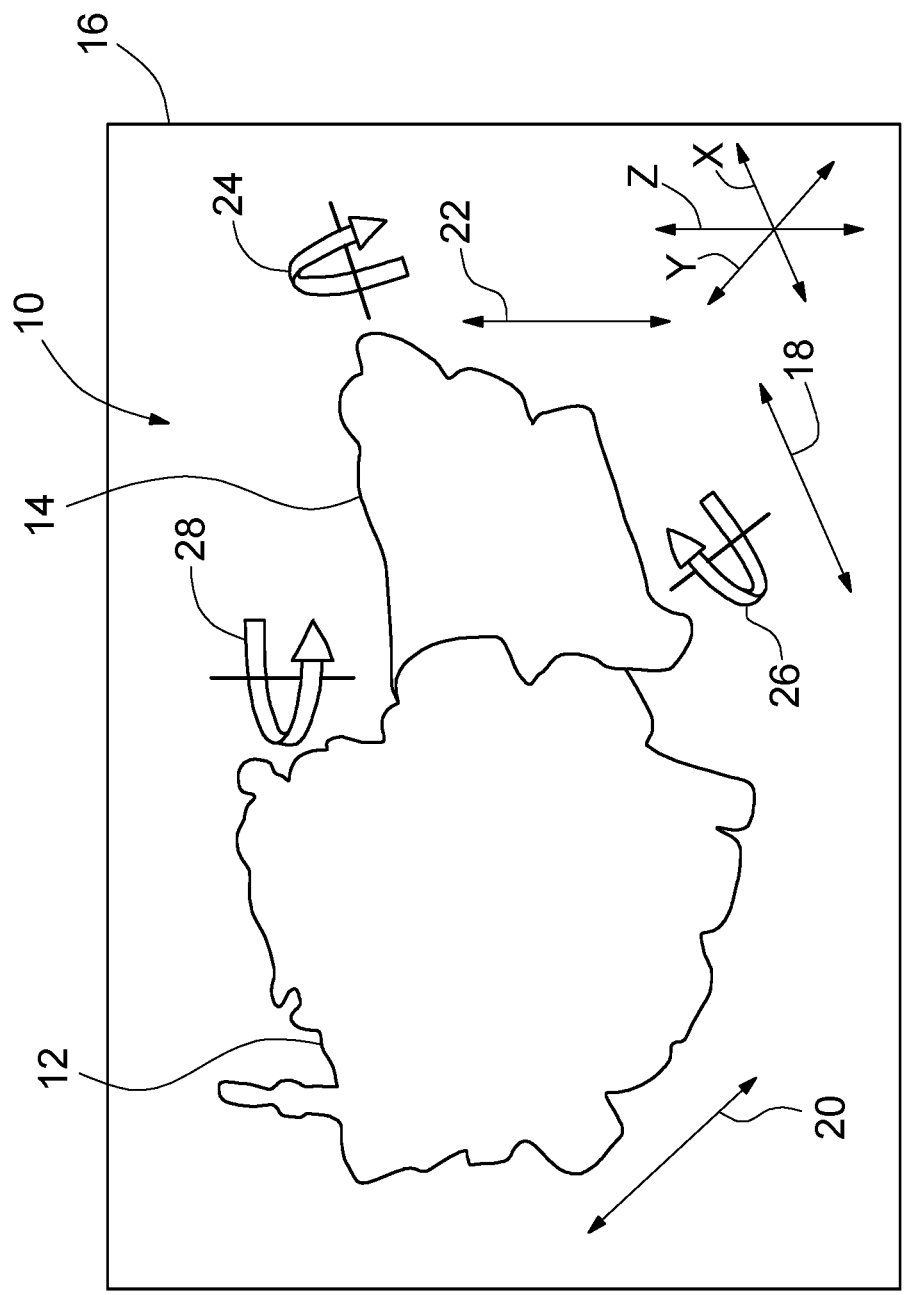
FIG. 1 is a perspective view of an automotive engine and transmission.

FIG. 1 illustrates an automotive powertrain, indicated generally at 10. As illustrated, the powertrain 10 includes an engine 12 and a transmission 14. The engine 12 and transmission 14 are coupled together such that the engine 12 supplies rotational torque to the transmission 14. The powertrain 10 propels an automotive vehicle 16. The powertrain 10, engine 12, transmission 14, and vehicle 16 are merely exemplary and may take other forms known to those skilled in the art.

Also illustrated are an axis X in a fore/aft direction, an axis Y in a lateral direction, and an axis Z in a vertical direction. The powertrain 10 has three translation modes: a fore/aft translation 18 along the axis X, a lateral translation 20 along the axis Y, and a vertical translation 22 along the axis Z. Additionally, the powertrain 10 has three rotational modes: a roll rotation 24 about the axis X, a pitch rotation 26 about the axis Y, and a yaw rotation 28 about the axis Z.

Figure 2:
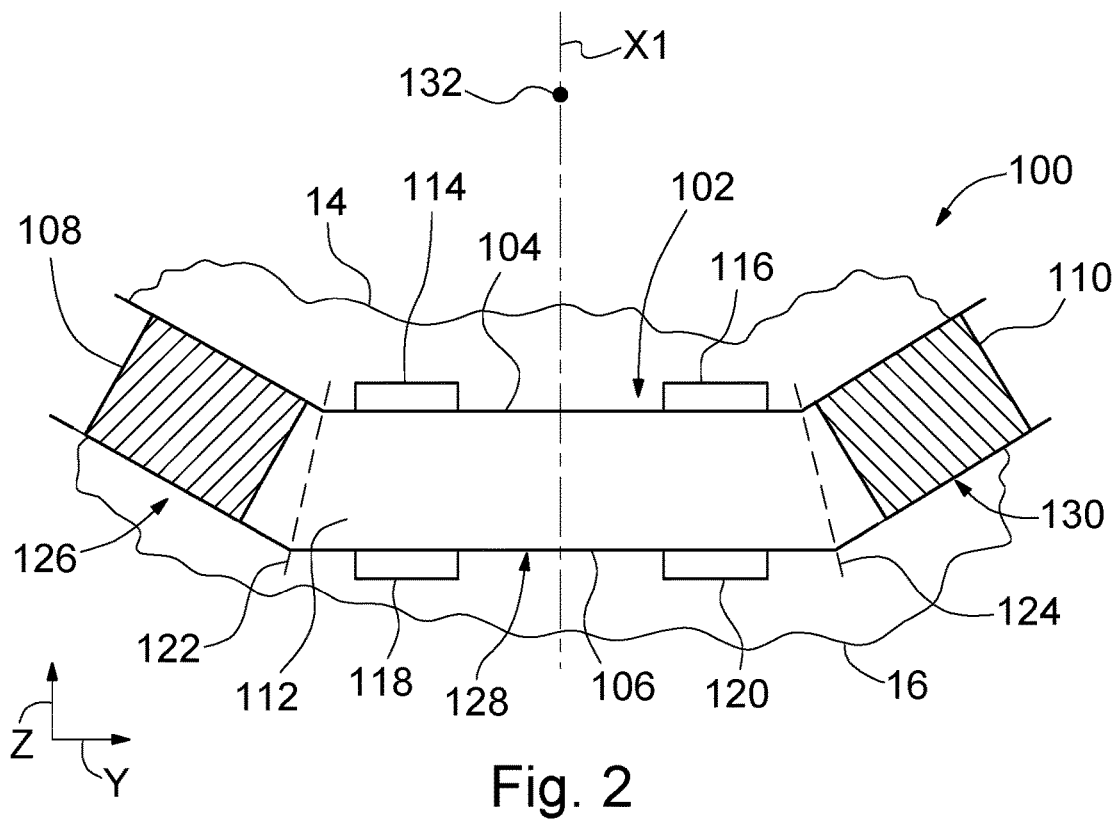
FIG. 2 is an end elevation view of a prior art transmission mount.

FIG. 2 illustrates a prior art transmission mount, indicated generally at 100, having a mount base, indicated generally at 102. The mount base 102 includes first and second plates 104 and 106, respectively. The first plate 104 is supported on the second plate 106 by first and second rubber pads 108 and 110, respectively, such that there is a separation 112 between the first and second plates 104 and 106, respectively.

The mount base 102 is attached to the transmission 14 at first and second transmission attachment points 114 and 116, respectively. The transmission 14 is attached to the mount base 102 using suitable means known to those skilled in the art. For example, the first and second attachment points 114 and 116, respectively, may be bolted connections. The mount base 102 is also attached to the vehicle 16 at third and fourth vehicle attachment points 118 and 120, respectively, using suitable means known to those skilled in the art. For example, the third and fourth connection points 118 and 120, respectively, may be bolted connections.

The first and second plates 104 and 106, respectively, are angled or bent towards the transmission 14, and away from the vehicle 16, at first and second planes 122 and 124, respectively—i.e., the first and second plates 104 and 106, respectively, angle upward as they extend out and away from a vehicle centerline X1. The first and second planes 122 and 124, respectively, divide the mount base 102 into a first end portion, indicated generally at 126, a middle portion, indicated generally at 128, and a second end portion, indicated generally at 130. The first and second end portions 126 and 130, respectively, are angled towards the transmission 14. The first and second planes 122 and 124 intersect above the mount base 102. As a result of the first and second end portions 126 and 130, respectively, being angled towards the transmission 14, an equivalent elastic center 132 of the mount 100 is defined or located above the mount base 102. A location of the elastic center 132 may be calculated using methods known to those skilled in the art.

Figure 3:
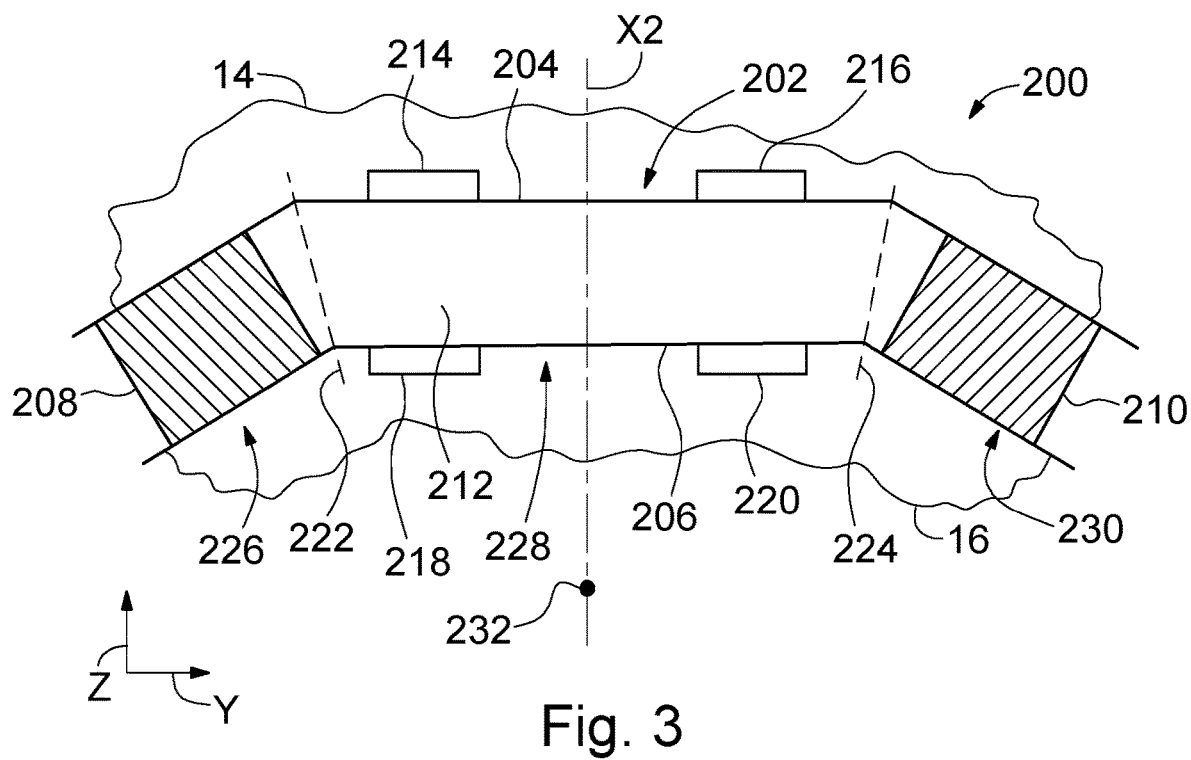
FIG. 3 is an end elevation view of a transmission mount employed with the transmission of FIG. 1.
Figure 4:
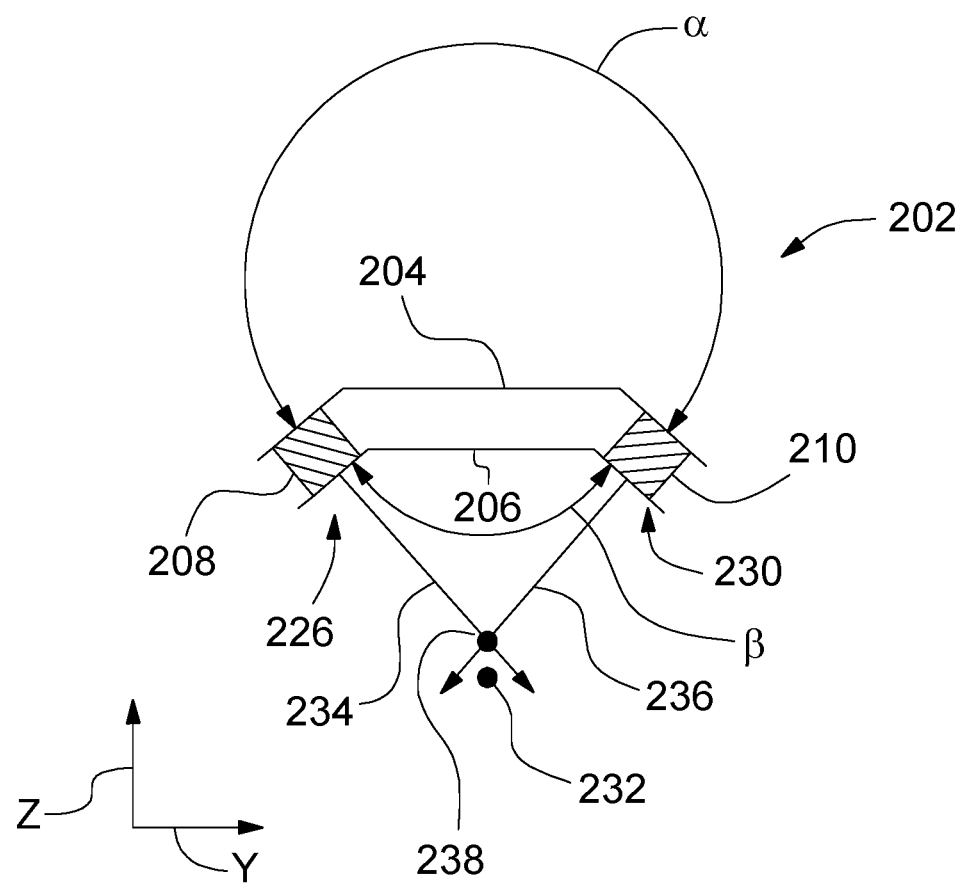
FIG. 4 is an end elevation view of the transmission mount of FIG. 3.

FIGS. 3 and 4 illustrate a transmission mount, indicated generally at 200, having a mount base 202. The mount base 202 includes substantially parallel first and second surfaces 204 and 206, respectively, in the form of metal plates. The first and second surfaces 204 and 206, respectively, are not limited to metal plates and may be fabricated from any suitable material and in any suitable shape. The first surface 204 is supported on the second surface 206 by first and second rubber pads 208 and 210, respectively, such that there is a separation 212 between the first and second surfaces 204 and 206, respectively. Alternatively, the first and second rubber pads 208 and 210, respectively, may be fabricated from a material other than rubber that provides desired isolation or damping for the mount base 202.

The mount base 202 is attached to the transmission 14 at first and second transmission attachment points 214 and 216, respectively. The transmission 14 is attached to the mount base 202 using suitable means known to those skilled in the art. For example, the first and second attachment points 214 and 216, respectively, may be bolted connections. The mount base 202 is also attached to the vehicle 16 at third and fourth vehicle attachment points 218 and 220, respectively, using suitable means known to those skilled in the art. For example, the third and fourth attachment points 218 and 220, respectively, may be bolted connections. The mount base 202 may be attached to a body, frame, or other suitable component or assembly of the vehicle 16.

The mount base 202 has first and second planes 222 and 224, respectively, that divide the mount base 202 into a first end portion, indicated generally at 226, a middle portion, indicated generally at 228, and a second end portion, indicated generally at 230. The first and second surfaces 204 and 206, respectively, are angled or bent towards the vehicle 16, and away from the transmission 14, at the first and second planes 222 and 224, respectively—i.e., the first and second surfaces 204 and 206, respectively, angle downward as they extend out and away from the vehicle centerline X2. In other words, the mount base 202 has the first and second end portions 226 and 230, respectively, angled towards the middle portion 228 of the second surface 206 between the first and second end portions 226 and 230, respectively. The first and second end portions 226 and 230, respectively, are angled towards the vehicle 16 and the second surface 206 in the middle portion 228. A first line 234 that is normal to the second surface 206 in the end portion 226 and a second line 236 that is normal to the second surface 206 in the second end portion 230 intersect below the mount base 202 at an intersection point 238. Furthermore, the first and second planes 222 and 224 intersect below the mount base 202.

As a result of the first and second end portions 226 and 230, respectively, being angled towards the vehicle 16, an equivalent elastic center 232 of the mount 200 is defined or located below the mount base 202. A location of the elastic center 132 may be calculated using methods known to those skilled in the art.

Where the elastic center 232 is defined below the mount base 202 may be tuned or adjusted by changing how angled the first and second end portions 226 and 230, respectively, are relative to the middle portion 228. A first angle α extends from the first surface 204 in the first end portion 226 to the first surface 204 in the second end portion 230 and a second angle β extends from the second surface 206 in the first end portion 226 to second surface 206 in the second end portion 230. The first angle α is greater than 180 degrees, the second angle β is less than 180 degrees, and together the first and second angles α and β, respectively, total 360 degrees. Alternatively, if the first and second surfaces 204 and 206, respectively, are not parallel, the first and second angles α and β, respectively, may total more or less than 360 degrees.

The vertical position of the elastic center 232 may be adjusted on the axis Z by increasing or decreasing the second angle β. When the second angle β is decreased towards zero degrees, the elastic center 232 will be defined and located closer to the mount base 202 and transmission 14. When the second angle β is increased towards 180 degrees, the elastic center 232 will be defined and located further below the mount base 202. As the elastic center 232 is lowered, a roll mode purity value for the powertrain 10 will approach 100%.

While certain embodiments of the present invention have been described in detail, those familiar with the art to which this invention relates will recognize various alternative designs and embodiments for practicing the invention as defined by the following claims.

What is claimed is:

1. A transmission mount comprising:
    a mount base having
        a first surface with a transmission attachment point;
        a second surface opposite the first surface and with a vehicle attachment point, wherein the mount base has first and second end portions angled towards a middle portion of the second surface between the first and second end portions.

2. The transmission mount of claim 1 wherein the first surface is a first plate, the second surface is a second plate, and the first and second plates are separated by rubber pads.

3. The transmission mount of claim 2 wherein the first plate is supported on the second plate by the rubber pads.

4. The transmission mount of claim 1 further comprising:
    a transmission attached to the transmission attachment point, wherein the angled first and second end portions define an elastic center of the mount below the mount base.

5. The transmission mount of claim 1 wherein first and second lines extend from the second surface, the first line is normal to the first end portion, the second line is normal to the second end portion, and the first and second lines intersect at an intersection point.

6. The transmission mount of claim 1 further comprising:
    a first angle extending from the first surface in the first end portion to the first surface in the second end portion, wherein the first angle is greater than 180 degrees;
    a second angle extending from the second surface in the first end portion to the second surface in the second end portion, wherein the second angle is less than 180 degrees.

7. The transmission mount of claim 6 wherein as the second angle is increased towards 180 degrees, an elastic center of the mount moves away from the middle portion.

8. The transmission mount of claim 6 wherein the first and second angles total 360 degrees.

9. The transmission mount of claim 1 wherein the vehicle attachment point attaches the transmission mount to a body or frame of an automotive vehicle.

10. A transmission mount comprising:
    a mount base having
        a first surface with a transmission attachment point;
        a second surface opposite the first surface and with a vehicle attachment point;
        first and second end portions angled towards a middle portion of the second surface between the first and second ends;
    a transmission attached to the transmission attachment point.

11. The transmission mount of claim 10 wherein the first surface is a first plate, the second surface is a second plate, and the first and second plates are separated by rubber pads.

12. The transmission mount of claim 10 wherein the angled first and second end portions define an elastic center of the mount below the mount base.

13. The transmission mount of claim 10 wherein first and second lines extend from, and are normal to, the second surface and the first and second lines intersect.

14. The transmission mount of claim 10 further comprising:
a first angle extending from the first surface in the first end portion to the first surface in the second end portion, wherein the first angle is greater than 180 degrees;
a second angle extending from the second surface in the first end portion to the second surface in the second end portion, wherein the second angle is less than 180 degrees.

15. The transmission mount of claim 14 wherein as the second angle is increased towards 180 degrees, an elastic center of the mount moves away from the middle portion.

16. A transmission mount comprising:
a mount base having
a first plate with a transmission attachment point;
a second plate opposite the first plate and with a vehicle attachment point;
rubber pads supporting the first plate on the second plate;
first and second end portions angled towards a middle portion of the second plate between the first and second end portions;
a transmission bolted to the transmission attachment point, wherein the angled first and second end portions define an elastic center of the mount below the mount base.

17. The transmission mount of claim 16 further comprising:
a first angle extending from the first plate in the first end portion to the first plate in the second end portion, wherein the first angle is greater than 180 degrees;
a second angle extending from the second plate in the first end portion to the second plate in the second end portion, wherein the second angle is less than 180 degrees.

18. The transmission mount of claim 17 wherein as the second angle is increased towards 180 degrees, the elastic center of the mount moves away from the middle portion.

* * * * *